United States Patent
Wang

(10) Patent No.: US 7,978,760 B2
(45) Date of Patent: Jul. 12, 2011

(54) DECISION FEEDBACK EQUALIZER HAVING ADJUSTING DEVICE AND METHOD THEREOF

(75) Inventor: Chih-chieh Wang, Pingjhen (TW)

(73) Assignee: Silicon Integrated Systems Corp., Hain-Chu (TW)

( * ) Notice: Subject to any disclaimer, the term of this patent is extended or adjusted under 35 U.S.C. 154(b) by 718 days.

(21) Appl. No.: 12/109,022

(22) Filed: Apr. 24, 2008

(65) Prior Publication Data
US 2009/0268802 A1 Oct. 29, 2009

(51) Int. Cl.
*H03H 7/30* (2006.01)
*H03K 5/159* (2006.01)
(52) U.S. Cl. ........................................ 375/233
(58) Field of Classification Search ............... 375/233, 375/340, 341, 350; 708/300, 322, 323; 360/65
See application file for complete search history.

(56) References Cited

U.S. PATENT DOCUMENTS
7,110,449 B2* 9/2006 Heo et al. ............... 375/233
2005/0129143 A1* 6/2005 Kang et al. ............... 375/233
2006/0291553 A1* 12/2006 Nemer ..................... 375/233
2007/0058710 A1* 3/2007 Chang ..................... 375/233
* cited by examiner Primary Examiner — Betsy Deppe
(74) Attorney, Agent, or Firm — Kirton & McConkie; Evan R. Witt

(57) ABSTRACT

A decision feedback equalizer having an adjusting device and method thereof are described. The decision feedback equalizer having an adjusting device includes a feed-forward filter, a decision device, a feedback filter, the adjusting device, and a summation device. The feed-forward filter generates a forwarding signal ($S_{ff}$) based on an input signal ($S_i$). The decision device generates a first decision ($S_{d1}$) signal and a second decision signal ($S_{d2}$) which are associated with the summation signal ($S_{su}$). The feedback filter receives the second decision signal ($S_{d2}$) for generating a feedback signal ($S_{fb}$). The adjusting device adjusts the first decision signal ($S_{d1}$) according to a first weighting value ($V_1$) for generating a first adjusted signal ($S_{a1}$) and transmitting the first adjusted signal ($S_{a1}$) to the feed-forward filter. The adjusting device further adjusts the feedback signal ($S_{fb}$) according to a second weighting value ($V_2$) for generating a second adjusted signal ($S_{a2}$). The summation device receives the forwarding signal ($S_{ff}$) and the second adjusted signal ($S_{a2}$) for generating a summation signal ($S_{su}$) and issuing the summation signal ($S_{su}$) to the decision device.

20 Claims, 3 Drawing Sheets

DECISION FEEDBACK EQUALIZER HAVING ADJUSTING DEVICE AND METHOD THEREOF

FIELD OF THE INVENTION

The present invention relates to an equalizer and method thereof, and more particularly relates to a decision feedback equalizer having an adjusting device and method thereof.

BACKGROUND OF THE INVENTION

A decision feedback equalizer (DFE) is usually applied in the equalization of a modern communication system, such as the Advanced Television Systems Committee, ATSC). Generally, digital 8-level vestigial sideband (8-VSB) is utilized as the modulation method.

FIG. 1 shows a schematic diagram of data frames according to the conventional ATSC standard for high definition television (HDTV) system. Each data frame 100 includes two fields. Each field has one field sync segment (FIELD_SYNC #1 or #2) 102 and 313 data segments (DATA) 104. Each segment begins with four binary-level symbols (SEGMENT_SYNC) 106 having a regular pattern of {+5, −5, −5, +5}. In a data segment 104, the number of eight hundred twenty eight symbols 108 are data symbols resulting from forward error correction (FEC) coding and having values randomly in {+−1, +−3, +−5, +−7}. In the field sync segment 102, the 828 symbols 108 mostly include binary {+5, −5} pseudo random (PN) sequences. These PN sequences are used to train the coefficients of the equalizer such that the equalizer can compensate for the intersymbol interference (ISI) caused by the multi-path propagation of the signal.

Typically, the conventional equalizer operates based on two modes, including a training mode and an error tracking mode. The equalizer is represented by the following formula:

$$x[k] = \sum_{i=0}^{N_b-1} a_i[k]y[k-i] - \sum_{j=1}^{N_a} b_j[k]\hat{x}[k-j]$$

where "$a_i$" is the feed-forward filter coefficients, "y" is the input signal, "$b_j$" is the feedback filter coefficients, "x" is the equalizer output signal, "$N_a$" is the range of "i", "$N_b$" is the range of "j", and $\hat{x}$ is decision device output.

In the training mode, the feed-forward filter coefficient "$a_i$" and the feedback filter coefficient "$b_j$" are represented by the following expressions:

$$a_i[k+1]=a_i[k]-\mu e_D[k]y[k-i]$$

$$b_j[k+1]=b_j[k]+\mu e_D[k]\hat{x}[k-j]$$

where "$e_D$" is called the decision-directed error and represented by the following expression:

$$e_D[k]=x[k]-\hat{x}[k]$$

In the error tracking mode using stop-and-go (SAG) algorithm, the feed-forward filter coefficient "$a_i$" and the feedback filter coefficient "$b_j$" are represented by the following expressions:

$$a_i[k+1]=a_i[k]-\mu f[k]e_D[k]y[k-i]$$

$$b_j[k+1]=b_j[k]+\mu f[k]e_D[k]\hat{x}[k-j]$$

f[k]=1 if sgn{$e_D$[k]}=sgn{$e_s$[k]} and f[k]=0 otherwise where "$e_s$" is called the Sato error and represented by the following expression:

$$e_s[k]=x[k]-\gamma sgn\{x[k]\} \text{ and } \gamma=E[|x_c[k]|^2]/E[|x_c[k]|]$$

where "γ" is a constant scalar, sgn [ ] is the signum function, "E{ }" stands for expectation, and "$x_c$[k]" is the transmitted symbol.

However, DFE-based receivers have an inherent potential to turn single error to burst errors, the so-called error propagation. Moreover, the equalizer usually needs millions of symbols to be converged.

Consequentially, there is a need to develop a novel decision feedback equalizer (DFE) to solve the aforementioned problems.

SUMMARY OF THE INVENTION

The first objective of the present invention is to provide a decision feedback equalizer having an adjusting device and method thereof to decrease the convergence time.

The second objective of the present invention is to provide a decision feedback equalizer having an adjusting device and method thereof to mitigate and/or avoid the error propagation.

According to the above objectives, the present invention sets forth a decision feedback equalizer having an adjusting device and method thereof. The decision feedback equalizer having an adjusting device includes a feed-forward filter, a decision device, a feedback filter, the adjusting device, and a summation device.

The feed-forward filter generates a forwarding signal ($S_{ff}$) based on an input signal ($S_i$). The decision device generates a first decision ($S_{d1}$) signal and a second decision signal ($S_{d2}$) which are associated with the summation signal ($S_{su}$). The feedback filter receives the second decision signal ($S_{d2}$) for generating a feedback signal ($S_{fb}$). The adjusting device adjusts the first decision signal ($S_{d1}$) according to a first weighting value ($V_1$) for generating a first adjusted signal ($S_{a1}$) and transmitting the first adjusted signal ($S_{a1}$) to the feed-forward filter. The adjusting device further adjusts the feedback signal ($S_{fb}$) according to a second weighting value ($V_2$) for generating a second adjusted signal ($S_{a2}$). The summation device receives the forwarding signal ($S_{ff}$) and the second adjusted signal ($S_{a2}$) for generating a summation signal ($S_{su}$) and issuing the summation signal ($S_{su}$) to the decision device. The adjusting device will be described in detail below.

In one embodiment, the decision device includes a hard decision device and a trellis decoder. The first decision signal ($S_{d1}$) is generated by the hard decision device. The second decision signal ($S_{d2}$) is generated by the trellis decoder while the data are encoded by the trellis encoder. Preferably, the trace-back depth of the hard decision device is zero. The trace-back depth of the trellis decoder is one to improve the symbol error rate (SER) and balance the delay of the trellis decoder.

The adjusting device further includes a channel estimator, a convolver, a controller, a first multiplying device, and a second multiplying device. The channel estimator couples the feed-forward filter to the convolver. The controller is coupled to the feed-forward filter and the convolver, respectively, via the first multiplying device. The controller is further coupled to the feedback filter and the summation device, respectively, via the second multiplying device.

The channel estimator estimates the input signal ($S_i$) for generating a channel estimation signal ($S_{es}$). The convolver receives the first decision signal ($S_{d1}$) and the channel estimation signal ($S_{es}$) for generating a convolution signal ($S_{co}$). The controller generates the first weighting value ($V_1$) and the second weighting value ($V_2$). The first multiplying device multiplies the convolution signal ($S_{co}$) from the convolver by the first weighting value ($V_1$) for generating the first adjusted signal ($S_{a1}$) to be transmitted to the feed-forward filter. The second multiplying device multiplies the feedback signal ($S_{fb}$) from the feedback filter by the second weighting value ($V_2$) for generating the second adjusted signal ($S_{a2}$) to be transmitted to the summation device.

The convolver and the channel estimator of the adjusting device rapidly correct the first decision signal ($S_{d1}$) by increasing the value of α to accelerate the convergence of the equalizer. While the equalizer is converged well, the value of α is decreased and the value of β is increased to finely tune the second decision signal ($S_{d2}$) so that error propagation of the equalizer is decreased and improved. In one embodiment, the controller of the adjusting device adjusts the values of α and β based on the signal to noise ration (SNR) of the equalizer. If SNR of equalizer is low, the value of α is increased to decrease the convergence time. Conversely, if SNR of equalizer is high, the value of α is decreased and the value of β is increased to precisely tune the second decision signal ($S_{d2}$) in order to mitigate and/or avoid the error propagation.

In operation, the method of performing the decision feedback equalizer having an adjusting device includes the following steps of:

(1) Generating a forwarding signal based on an input signal by a feed-forward filter.

(2) Generating a first decision signal and a second decision signal which are associated with the summation signal ($S_{su}$) by using a decision device.

(3) Receiving the second decision signal for generating a feedback signal by a feedback filter.

(4) Adjusting the first decision signal according to a first weighting value by a adjusting device for generating a first adjusted signal and transmitting the first adjusted signal to the feed-forward filter, and adjusting the feedback signal according to a second weighting value for generating a second adjusted signal.

(5) During the step of adjusting the first decision signal and the feedback signal according to the first weighting value and the second weighting value in the step S306, the adjusting device further performs the following steps: (1) estimating the input signal for generating an estimation signal during the FIELD_SYNC stage wherein the equalizer is operated in the training mode and $V_1(\alpha)=0$, that is, the convolver 214 is disabled; and (2) convoluting the first decision signal and the channel estimation signal for generating a convolution signal.

The controller generates the first weighting value and the second weighting value. During the step S306, the adjusting device further performs the following steps: (1) multiplying the convolution signal from the convolver by the first weighting value for generating the first adjusted signal to be transmitted to the feed-forward filter; and (2) multiplying the feedback signal from the feedback filter by the second weighting value for generating the second adjusted signal to be transmitted to the summation device. A ratio of the first weighting value to the second weighting value is adjusted based on a signal-to-noise ratio of the decision feedback equalizer. The sum of the first weighting value and the second weighting value is predetermined value.

(6) Receiving the forwarding signal and the second adjusted signal by a summation device for generating a summation signal and issuing the summation signal to the decision device.

(7) Receiving the summation signal and the second decision signal, respectively to evaluate the error of the second decision signal based on the summation signal.

(8) Predicting the summation signal to whiten the noise of the forwarding signal ($S_{ff}$) by the noise predictor and the whitened forwarding signal ($S_{ff}$) to be transmitted to the summation device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
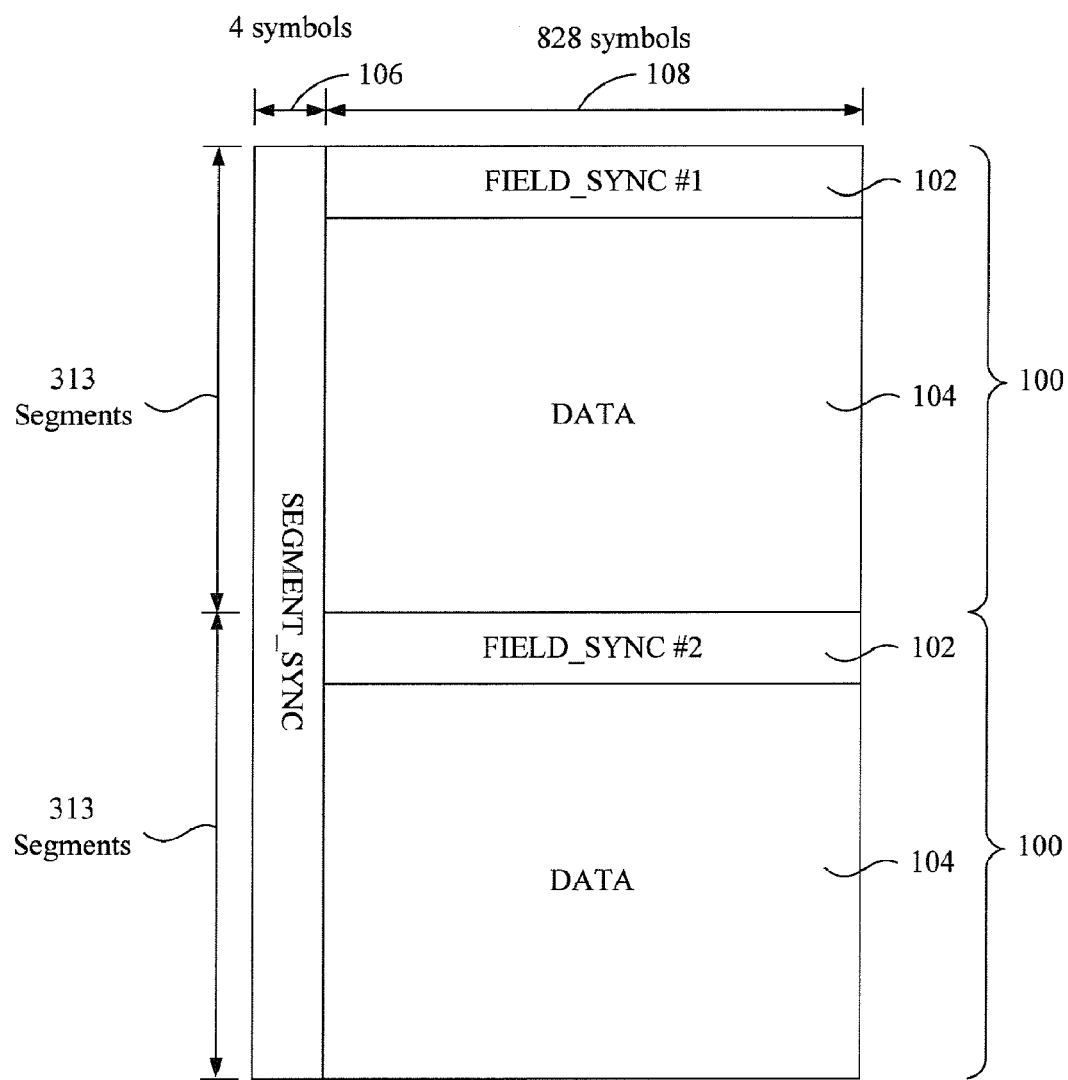
FIG. 1 is a schematic diagram of data frames according to the conventional ATSC standard for high definition television (HDTV) system.
Figure 2:
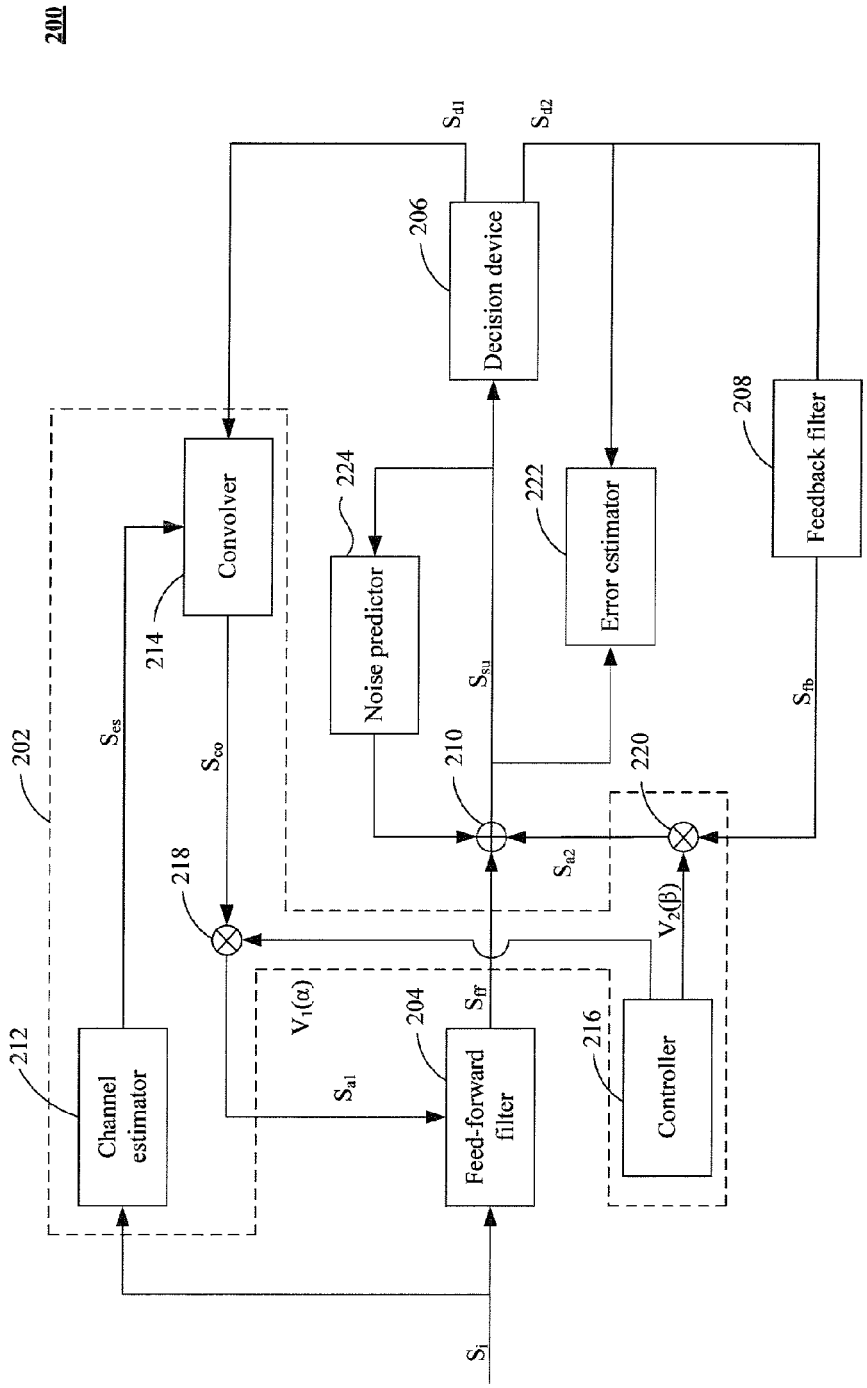
FIG. 2 is a schematic block diagram of decision feedback equalizer (DFE) having an adjusting device according to one embodiment of the present invention.

FIG. 2 is a schematic block diagram of decision feedback equalizer (DFE) 200 having an adjusting device 202 according to one embodiment of the present invention. The decision feedback equalizer 200 includes a feed-forward filter 204, a decision device 206, a feedback filter 208, the adjusting device 202, and a summation device 210. The feed-forward filter 204 is coupled to the adjusting device 202. The summation device 210 couples the feed-forward filter 204 to the decision device 206. The feedback filter 208 couples the decision device 206 to the adjusting device 202.

The feed-forward filter 204 generates a forwarding signal ($S_{ff}$) based on an input signal ($S_i$). The decision device 206 generates a first decision signal ($S_{d1}$) and a second decision signal ($S_{d2}$) which are associated with the summation signal ($S_{su}$). The feedback filter 208 receives the second decision signal ($S_{d2}$) for generating a feedback signal ($S_{fb}$). The adjusting device 202 adjusts the first decision signal ($S_{d1}$) according to a first weighting value ($V_1$) for generating a first adjusted signal ($S_{a1}$) and transmitting the first adjusted signal ($S_{a1}$) to the feed-forward filter 204. The adjusting device 202 further adjusts the feedback signal ($S_{fb}$) according to a second weighting value ($V_2$) for generating a second adjusted signal ($S_{a2}$). The summation device 210 receives the forwarding signal ($S_{ff}$) and the second adjusted signal ($S_{a2}$) for generating a summation signal ($S_{su}$) and issuing the summation signal ($S_{su}$) to the decision device 206. The adjusting device 202 will be described in detail below.

In one embodiment, the decision device 206 includes a hard decision device and a trellis decoder. The first decision signal ($S_{d1}$) is generated by the hard decision device. The second decision signal ($S_{d2}$) is generated by the trellis decoder while the data are encoded by the trellis encoder. Preferably, the trace-back depth of the hard decision device is zero. The trace-back depth of the trellis decoder is one to improve the symbol error rate (SER) and balance the delay of the trellis decoder. However, more higher values, e.g. two or three, of trace-back depth can be used in the trellis decoder for further improve the value of SER.

The adjusting device 202 further includes a channel estimator 212, a convolver 214, a controller 216, a first multiplying device 218, and a second multiplying device 220. The channel estimator 212 couples the feed-forward filter 204 to the convolver 214. The controller 216 is coupled to the feed-forward filter 204 and the convolver 214, respectively, via the first multiplying device 218. The controller 216 is further coupled to the feedback filter 208 and the summation device 210, respectively, via the second multiplying device 220.

The channel estimator 212 estimates the input signal ($S_i$) for generating a channel estimation signal ($S_{es}$). The convolver 214 receives the first decision signal ($S_{d1}$) and the channel estimation signal ($S_{es}$) for generating a convolution signal ($S_{co}$). The controller 216 generates the first weighting value ($V_1$) and the second weighting value ($V_2$). The first multiplying device 218 multiplies the convolution signal ($S_{co}$) from the convolver 216 by the first weighting value ($V_1$) for generating the first adjusted signal ($S_{a1}$) to be transmitted to the feed-forward filter 204. The second multiplying device 220 multiplies the feedback signal ($S_{fb}$) from the feedback filter 208 by the second weighting value ($V_2$) for generating the second adjusted signal ($S_{a2}$) to be transmitted to the summation device 210.

In one embodiment, the decision feedback equalizer 200 further includes an error estimator 222 and a noise predictor 224. The error estimator 222 is coupled to the decision device 206 for receiving the summation signal ($S_{su}$) and the second decision signal ($S_{d2}$), respectively to evaluate the error of the second decision signal ($S_{d2}$) based on the summation signal ($S_{su}$). The noise predictor 224 predicts the summation signal ($S_{su}$) to whiten the noise of the forwarding signal ($S_{ff}$) and the whitened forwarding signal ($S_{ff}$) to be transmitted to the summation device. In one embodiment, the cascaded feed-forward filter 204 and the noise predictor 224 are all-pass systems, respectively.

Typically, two types of inter-symbol interference (ISI) are classified. The first type is called the pre-cursor ISI. Pre-cursor ISI is the interference caused by the symbols transmitted after the current symbol on the received current symbol. The other type is called the post-cursor ISI. The post-cursor ISI is caused by the symbols, which are transmitted before the current symbol on the received current symbol. Generally speaking, the feed-forward filter 204 is utilized to cancel the pre-cursor ISI and the feedback filter 208 is utilized to handle the post-cursor ISI caused by convolution results of channel response coefficients and forward filter coefficients. When processing a current symbol, the equalization filter multiplies a group of coefficients on the received symbols. The filtered results of the forward filter and the feedback filter are added in the summation device 210 and then transmitted as the output data stream.

Normally, the equalizer operates in two kinds of situations. The first is called the training mode. In this mode, the receiver knows the correct value of the received data. After the training mode, the equalizer continues operating on the second mode, called the error tracking mode. In this situation, the receiver has no idea about the original values of the input data, and the receiver needs to estimate the original values for calculating the error values of the equalization.

The decision feedback equalizer 200 having the adjusting device 202 can be represented and operated by the following equation (E1), and if $\alpha+\beta=1$, wherein $\alpha$ is the first weighting value ($V_1$) and $\beta$ is the second weighting value ($V_2$), then:

$$x[n-K] = \tag{E1}$$

$$\sum_{i=-K}^{L} a_i[n-K]\left\{y[n-(K+i)] - \alpha\sum_{j=1}^{D} \hat{x}_{HD}[n-(K+i)-j]\hat{h}[j]\right\} -$$

$$(1-\alpha)\sum_{i=1}^{M} b_i[n-K]\hat{x}_{TD}[n-(K+i)]$$

Where "$a_i$" are the coefficients of the feed-forward filter 204 and "i" has a range from "−K" to "L"; "n" is time index; y[k] is the input signal ($S_i$) at time k; "$b_i$" are the coefficients of the feedback filter 208 and "i" has a range from 1 to "M"; $\hat{x}_{HD}$ is the decision device output associated with hard decision; and $\hat{x}_{TD}$ is the decision device output associated with trellis decision; $\hat{h}[j]$ is the estimated channel impulse response; and D is the estimated anti-causal channel length.

We replace $$y[n] = \sum_{k=-L_a}^{L_c} h[k]x[n-k] + \eta[n]$$

and assume $D \leq L_c$; $x = \hat{x}_{HD} = \hat{x}_{TD}$; and $h = \hat{h}$.

$$x[n-K] = \tag{E1}$$

$$\sum_{i=-K}^{L} a_i[n-K]\left\{\sum_{j=-L_a}^{-1} x[n-(K+i)-j]h[j] + x[n-(K+i)]h[0] + \right.$$

$$\left. \eta[n] + (1-\alpha)\sum_{j=1}^{D} x[n-(K+i)-j]h[j]\right\} -$$

$$(1-\alpha)\sum_{i=1}^{M} b_i[n-K]x[n-(K+i)]$$

Where "$L_a$" is the actual anti-causal channel length associated with pre-cursor response; and h[j] is the channel impulse response.

$$\sum_{i=-K}^{L} a_i[n-K]\left\{\sum_{j=-L_a}^{-1} x[n-(K+i)-j]h[j]\right\} \tag{E1-1}$$

$$\sum_{i=-K}^{L} a_i[n-K]\{x[n-(K+i)]h[0] + \eta[n]\} \tag{E1-2}$$

$$\sum_{i=-K}^{L} a_i[n-K]\left\{(1-\alpha)\sum_{j=1}^{D} x[n-(K+i)-j]h[j]\right\} - \tag{E1-3}$$

$$(1-\alpha)\sum_{i=1}^{M} b_i[n-K]x[n-(K+i)]$$

Where the expression (E1-2) of the equation (E1) is a wanted signal except the noise term $\eta(n)$, the expression (E1-1) of the equation (E1) is the precursor ISI, and the expression (E1-3) of the equation (E1) are the percursor ISI.

In one embodiment, the feed-forward filter 204 includes two buffers wherein one buffer is used to store data therein and the other is used to store feed-forward coefficients ($a_i$). Similarly, the feedback filter 208 has two buffers wherein one buffer is used to store data therein and the other is used to store feedback coefficients ($b_i$). While the data stream is inputted to the feed-forward filter 204, each symbol of the data is corresponding to one coefficient. In the equation (E1), "n" is a time index, the range of "−K" to "L" is the time length of the feed-forward filter 204, and the range of one to "M" is the time length of the feedback filter 208. Preferably, "K", "L" and "M" are positive integer, associated with the channel length, so that the range values of "K", "L" and "M" contain the interval having the noises signal therein.

At the very beginning of start stage or recovery stage (from error propagation), the convergence time takes millions of symbols. To decrease the convergence time, the controller 216 of the adjusting device 202 sets α=1 to cancel the postcursor ISI via the convolver 214. When the equalizer 200 is converged well, the value of α to 0.125 is decreased and the value can be implemented by bitwise operation in hardware. Person skilled in the art should be noted that the sum of α+β can be constant and α is selectable for cancelling the postcursor ISI. That is, the sum of the first weighting value and the second weighting value is predetermined value. Therefore, the postcursor ISI cancellation is mainly done by the feedback filter 208. As a result, the convergence time of the decision feedback equalizer is effectively decreased.

The convolver 214 and the channel estimator 212 of the adjusting device 202 rapidly correct the input signal ($S_i$) by increasing the value of α to accelerate the convergence of the equalizer. While the equalizer is converged well, the value of α is decreased and the value of β is increased to finely tune the equalizer so that error propagation of the equalizer is decreased and improved. In one embodiment, the controller 216 of the adjusting device 202 adjusts the values of α and β based on the signal-to-noise ratio (SNR) of the equalizer. If SNR of equalizer is low, the value of α is increased to decrease the convergence time. Conversely, if SNR of equalizer is high, the value of α is decreased and the value of β is increased to precisely tune the equalizer 200 in order to mitigate and/or avoid the error propagation.

As discussed above, the convolver 214 convolutes the first decision signal ($S_{d1}$) with the channel estimation signal to cancel the postcursor ISI of the input signal ($S_i$) when the convolution signal is multiplied by α for generating the first adjusting signal ($S_{a1}$) to be added to the feed-forward filter 204. Furthermore, the feedback filter 208 receives the second decision signal ($S_{d2}$) for generating a feedback signal ($S_{fb}$) and cancels the postcursor ISI of the second decision signal ($S_{d2}$) when the feedback signal ($S_{fb}$) is multiplied by β for generating the second adjusting signal ($S_{a2}$) to be added to the summation device 210 for the decision device 206.

In one embodiment, the decision device 206 includes a trellis decoder and a hard decision device for generating the first decision signal ($S_{d1}$) and the second decision signal ($S_{d2}$), respectively.

During each of the field syncs (FIELD_SYNC), the channel estimator 212 estimates the channel impulse response (CIR) using either of the following methods:

1. Correlation method:
The pre-cursor impulse response can be derived by $$\hat{h}_a[n] = \sum_k s[k]y[k+n]$$

for $n = 0, -1, \ldots, -N_{ff}$ where s[k] is the stored pseudo random (PN) sequence, y[n] is the received symbol and $N_{ff}$ is positive integer for feed-forward filter 204.

In the same manner, the post-cursor response can be derived by $$\hat{h}_c[n] = \sum_k s[k]y[k+n]$$

for $n = 1, 2, \ldots, N_{fb}$ where $N_{fb}$ is positive integer for feedback filter 208.

Hence, the estimated channel impulse response is $$\hat{h}[n] = \hat{h}_a[n] + \hat{h}_c[n]$$

2. Least-squares method:
Let $\bar{h}=[h[-L_a], h[-K+1], \ldots, h[0], \ldots, h[L_c]]$ denote the channel impulse response (CIR)
The output and the CIR have the relation:

$$y[n] = \sum_k h[k]s[n-k]$$

And we can translate it into the following matrix form:

$$\begin{bmatrix} y[0] \\ y[1] \\ \vdots \\ y[M] \end{bmatrix} = \begin{bmatrix} s[L_a] & s[L_a-1] & \ldots & s[-L_c] \\ \vdots & \ddots & & \vdots \\ \vdots & & \ddots & \vdots \\ s[M+L_a] & s[M+L_a-1] & \ldots & s[M-L_c] \end{bmatrix} \begin{bmatrix} h[-L_a] \\ h[-L_a+1] \\ \vdots \\ h[L_c] \end{bmatrix}$$

Two limitations:
A. FIELD_SYNC length: $M+L_c+L_a+1 \leq 4+511+63*3+24+92=820$
B. Full rank: $M+1 \geq L_c+L_a+1$
Hence $\hat{h}_{LS} = \arg\min\{(y-Sh)^H(y-Sh)\} = (S^HS)^{-1}S^Hy$
where the superscript H denotes "Hermitian."

Figure 3:
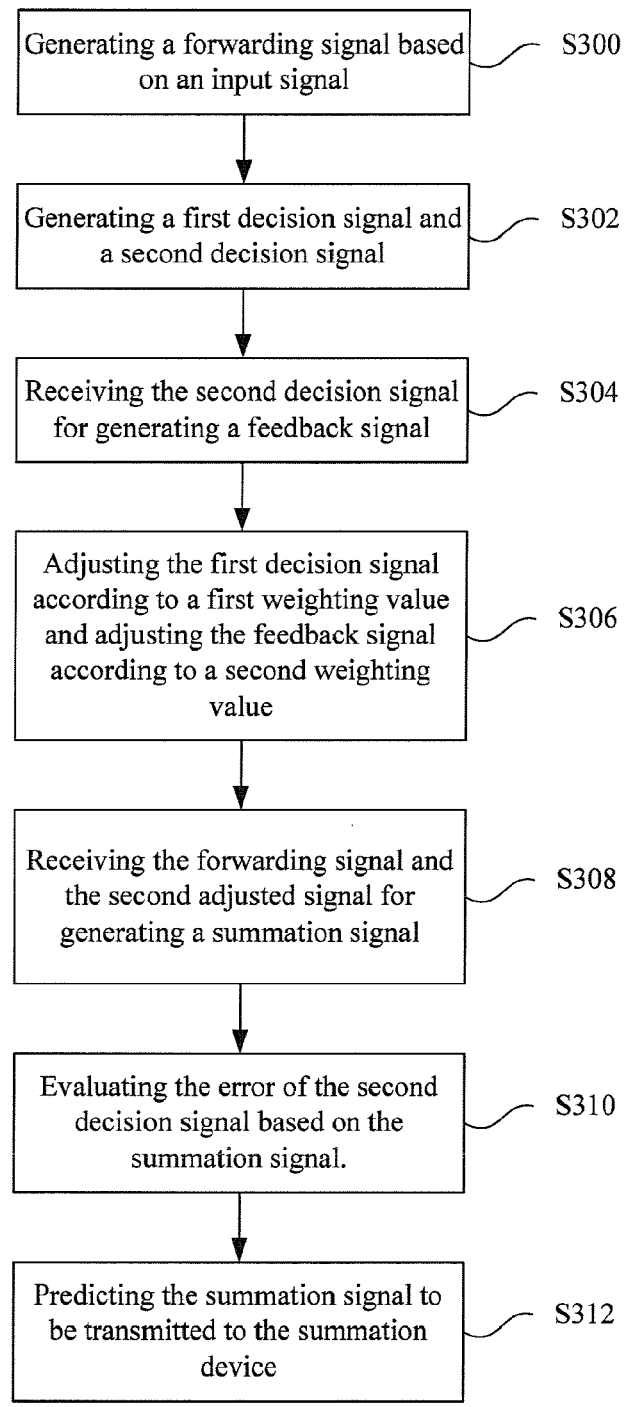
FIG. 3 is a flow chart of performing the decision feedback equalizer having an adjusting device according to one embodiment of the present invention.

Please refer to FIGS. 2 and 3. FIG. 3 shows a flow chart of performing the decision feedback equalizer having an adjusting device according to one embodiment of the present invention. The method of performing the decision feedback equalizer having an adjusting device includes the following steps of:

In step S300, generating a forwarding signal based on an input signal by a feed-forward filter 204.

In step S302, generating a first decision signal and a second decision signal which are associated with the summation signal ($S_{su}$) by using a decision device 206.

In step S304, receiving the second decision signal for generating a feedback signal by a feedback filter 208.

In step S306, adjusting the first decision signal according to a first weighting value by an adjusting device 202 for generating a first adjusted signal and transmitting the first adjusted signal to the feed-forward filter 204, and adjusting the feedback signal according to a second weighting value for generating a second adjusted signal.

During the step of adjusting the first decision signal and the feedback signal according to the first weighting value and the second weighting value in the step S306, the adjusting device further performs the following steps: (1) estimating the input signal for generating an estimation signal during the FIELD_SYNC stage wherein the equalizer is operated in the training mode and $V_1(\alpha)=0$, that is, the convolver 214 is disabled; and (2) convoluting the first decision signal and the channel estimation signal for generating a convolution signal.

The controller 216 generates the first weighting value and the second weighting value. During the step S306, the adjusting device further performs the following steps: (1) multiplying the convolution signal from the convolver 214 by the first weighting value for generating the first adjusted signal to be transmitted to the feed-forward filter 204; and (2) multiplying the feedback signal from the feedback filter 208 by the second weighting value for generating the second adjusted signal to be transmitted to the summation device 210. A ratio of the first weighting value to the second weighting value is adjusted based on a signal-to-noise ratio of the decision feedback equalizer 200. The sum of the first weighting value and the second weighting value is predetermined value.

In step S308, receiving the forwarding signal and the second adjusted signal by a summation device 210 for generating a summation signal and issuing the summation signal to the decision device 206.

In step S310, receiving the summation signal and the second decision signal, respectively to evaluate the error of the second decision signal based on the summation signal.

In step S312, predicting the summation signal to be transmitted to the summation device 210.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A decision feedback equalizer, comprising:
    a feed-forward filter generating a forwarding signal based on an input signal;
    a decision device, generating a first decision signal and a second decision signal which are associated with a summation signal;
    a feedback filter, coupled to the decision device, receiving the second decision signal for generating a feedback signal;
    an adjusting device, coupled to the feed-forward filter, the decision device and the feedback filter, respectively, adjusting the first decision signal according to a first weighting value for generating a first adjusted signal and transmitting the first adjusted signal to the feed-forward filter, and adjusting the feedback signal according to a second weighting value for generating a second adjusted signal; and
    a summation device coupled to the feed-forward filter, the decision device and the adjusting device, respectively, receiving the forwarding signal and the second adjusted signal for generating the summation signal and issuing the summation signal to the decision device.

2. The decision feedback equalizer of claim 1, wherein the adjusting device further comprises:
    a channel estimator, coupled to the feed-forward filter, estimating the input signal for generating a channel estimation signal; and
    a convolver, coupled to the channel estimator and the decision device, receiving the first decision signal and the channel estimation signal for generating a convolution signal.

3. The decision feedback equalizer of claim 2, wherein the adjusting device further comprises a controller for generating the first weighting value and the second weighting value.

4. The decision feedback equalizer of claim 3, wherein the adjusting device further comprises a first multiplying device for multiplying the convolution signal from the convolver by the first weighting value to generate the first adjusted signal to be transmitted to the feed-forward filter.

5. The decision feedback equalizer of claim 3, wherein the adjusting device further comprises a second multiplying device for multiplying the feedback signal from the feedback filter by the second weighting value to generate the second adjusted signal to be transmitted to the summation device.

6. The decision feedback equalizer of claim 3, wherein the controller adjusts a ratio of the first weighting value to the second weighting value based on a signal-to-noise ratio of the decision feedback equalizer.

7. The decision feedback equalizer of claim 1, further comprising an error estimator.

8. The decision feedback equalizer of claim 1, further comprising a noise predictor.

9. The decision feedback equalizer of claim 1, wherein a sum of the first weighting value and the second weighting value is a predetermined value.

10. The decision feedback equalizer of claim 1, wherein the first decision signal is generated by a hard decision device of the decision device and the second decision signal is generated by a trellis decoder of the decision device.

11. The decision feedback equalizer of claim 1, wherein the second decision signal is generated by a trellis decoder of the decision device.

12. A method of performing a decision feedback equalizer, the method comprising the steps of:
    generating, by a feed-forward filter, a forwarding signal based on an input signal;
    generating a first decision signal and a second decision signal which are associated with a summation signal by using a decision device;
    receiving the second decision signal for generating a feedback signal by a feedback filter;
    adjusting the first decision signal according to a first weighting value for generating a first adjusted signal and transmitting the first adjusted signal to the feed-forward filter, and adjusting the feedback signal according to a second weighting value for generating a second adjusted signal; and
    receiving the forwarding signal and the second adjusted signal by a summation device for generating the summation signal and issuing the summation signal to the decision device.

13. The method of claim 12, during the step of adjusting the first decision signal and the feedback signal according to the first weighting value and the second weighting value respectively, further comprising:
    estimating the input signal for generating an estimation signal; and
    convoluting the first decision signal and the channel estimation signal for generating a convolution signal.

14. The method of claim 13, further comprising a step of generating the first weighting value and the second weighting value.

15. The method of claim 14, further comprising a step of multiplying the convolution signal from the convolver by the first weighting value for generating the first adjusted signal to be transmitted to the feed-forward filter.

16. The method of claim 14, further comprising a step of multiplying the feedback signal from the feedback filter by the second weighting value for generating the second adjusted signal to be transmitted to the summation device.

17. The method of claim 14, wherein a ratio of the first weighting value to the second weighting value is adjusted based on a signal-to-noise ratio of the decision feedback equalizer.

18. The method of claim 13, wherein a sum of the first weighting value and the second weighting value is predetermined value.

19. The method of claim 13, further comprising a step of receiving the summation signal and the second decision signal respectively, to evaluate the error of the second decision signal based on the summation signal.

20. The method of claim 13, further comprising a step of predicting the summation signal.

* * * * *